(12) United States Patent
Lee

(10) Patent No.: US 8,297,654 B2
(45) Date of Patent: Oct. 30, 2012

(54) AIRBAG AND AIRBAG APPARATUS

(75) Inventor: Jun Hee Lee, Tokyo (JP)

(73) Assignee: Takata Corporation, Tokyo (JP)

( * ) Notice: Subject to any disclaimer, the term of this patent is extended or adjusted under 35 U.S.C. 154(b) by 35 days.

(21) Appl. No.: 13/069,210

(22) Filed: Mar. 22, 2011

(65) Prior Publication Data
US 2011/0241317 A1  Oct. 6, 2011

(30) Foreign Application Priority Data
Mar. 31, 2010 (JP) ................................. 2010-082497

(51) Int. Cl.
*B60R 21/16* (2006.01)
(52) U.S. Cl. .................. 280/743.1; 280/743.2
(58) Field of Classification Search ............... 280/743.1, 280/743.2
See application file for complete search history.

(56) References Cited

U.S. PATENT DOCUMENTS

| | | | |
|---|---|---|---|
| 5,772,239 A | 6/1998 | Seymour | |
| 5,865,466 A | 2/1999 | Yamamoto et al. | |
| 6,070,904 A | 6/2000 | Ozaki et al. | |
| 6,206,409 B1 | 3/2001 | Kato et al. | |
| 6,371,510 B1 * | 4/2002 | Marriott et al. | 280/730.1 |
| 6,682,093 B2 | 1/2004 | Tajima et al. | |
| 6,883,831 B2 * | 4/2005 | Hawthorn et al. | 280/739 |
| 6,955,377 B2 * | 10/2005 | Cooper et al. | 280/743.1 |
| 6,962,366 B2 | 11/2005 | Fukuda et al. | |
| 7,021,653 B2 * | 4/2006 | Burdock et al. | 280/730.1 |
| 7,314,228 B2 | 1/2008 | Ishiguro et al. | |
| 7,396,044 B2 * | 7/2008 | Bauer et al. | 280/743.2 |
| 7,441,804 B2 | 10/2008 | Rose et al. | |
| 7,597,343 B2 | 10/2009 | Miwa et al. | |
| 7,631,894 B2 * | 12/2009 | Hasebe et al. | 280/743.2 |
| 7,651,123 B2 * | 1/2010 | Hasebe et al. | 280/729 |
| 7,845,683 B2 | 12/2010 | Sato et al. | |
| 2002/0020995 A1 * | 2/2002 | Abe et al. | 280/743.1 |
| 2007/0018438 A1 | 1/2007 | Hasebe et al. | |
| 2007/0241541 A1 * | 10/2007 | Miwa et al. | 280/728.2 |

FOREIGN PATENT DOCUMENTS

| | | |
|---|---|---|
| JP | S50-131742 U1 | 10/1975 |
| JP | H08-156733 A | 6/1996 |
| JP | H08-268198 A | 10/1996 |
| JP | H09-118187 A | 5/1997 |
| JP | H10-006897 A | 1/1998 |
| JP | H10-067290 A | 3/1998 |
| JP | H11-028997 A | 2/1999 |
| JP | H11-059310 A | 3/1999 |
| JP | 2003-081046 A | 3/2003 |
| JP | 2004-010002 A | 1/2004 |
| JP | 2004-299654 A | 10/2004 |
| JP | 2005-212664 A | 8/2005 |
| JP | 2006-027374 A | 2/2006 |
| JP | 2007-030614 A | 2/2007 |
| JP | 2008-273260 A | 11/2008 |

\* cited by examiner

*Primary Examiner* — Toan To
(74) *Attorney, Agent, or Firm* — Fitch Even Tabin & Flannery, LLP

(57) ABSTRACT

In one form, an airbag is provided including an airbag main body formed into a pouch; an inner restricting cloth that comprises a tearable tear line and wraps and restricts the airbag main body that is in a first folded state, folded to achieve bundling toward a predetermined direction, in the bundled direction; and an outer restricting cloth that comprises a tearable tear line and wraps and restricts the airbag main body that is in a second folded state, folded to achieve further bundling from the first folded state toward a direction orthogonal to the predetermined direction, in the bundled direction further on the outside than the inner restricting cloth.

13 Claims, 15 Drawing Sheets

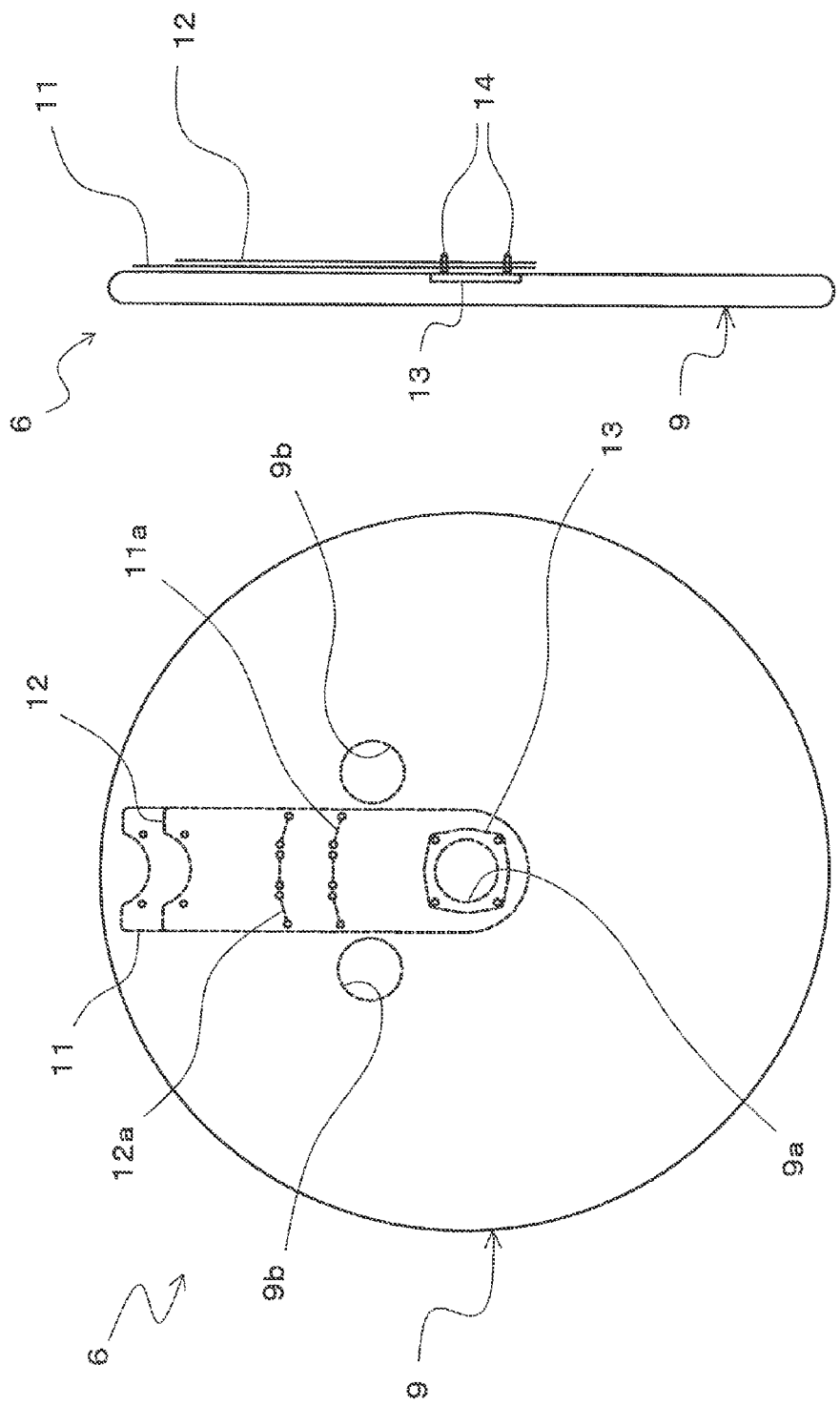

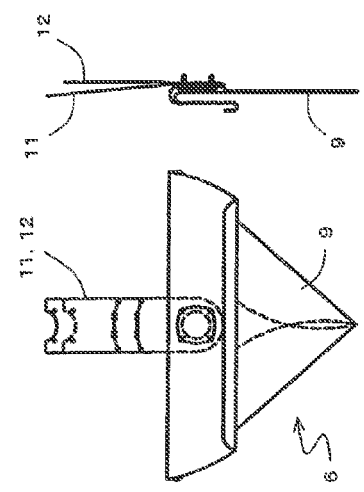
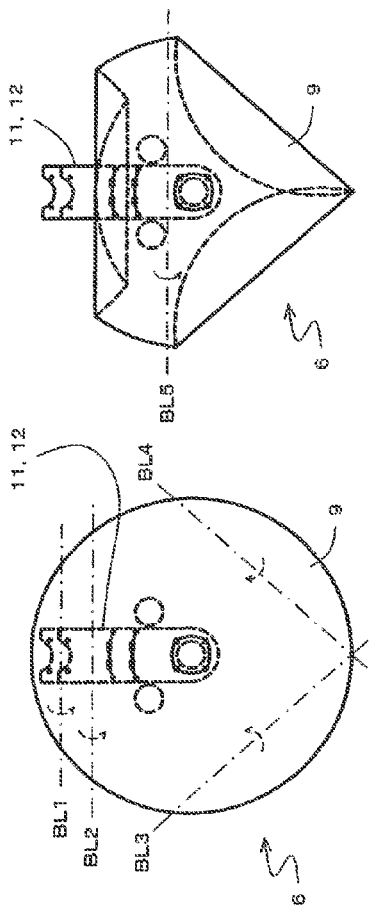
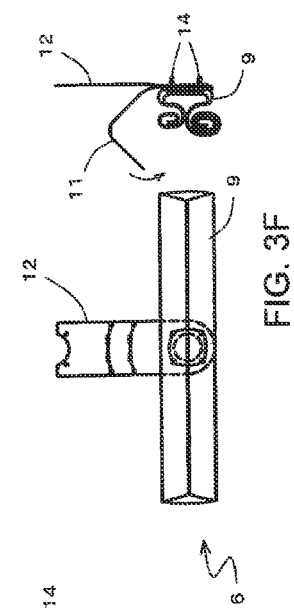
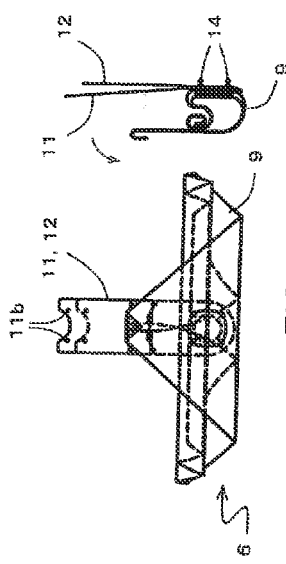
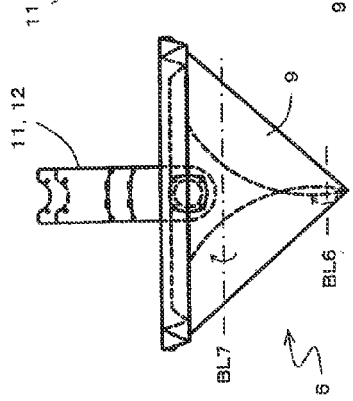

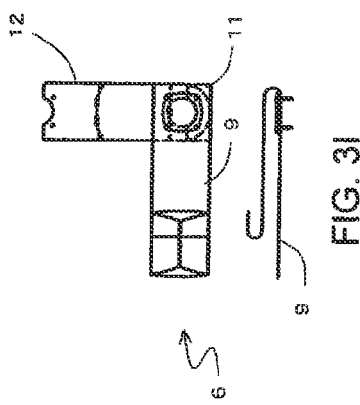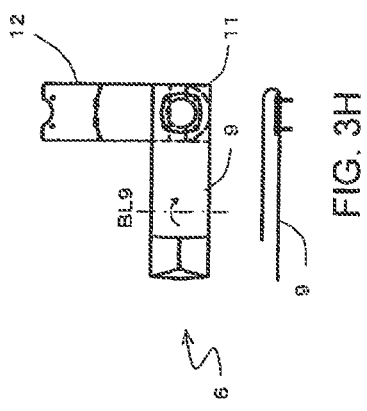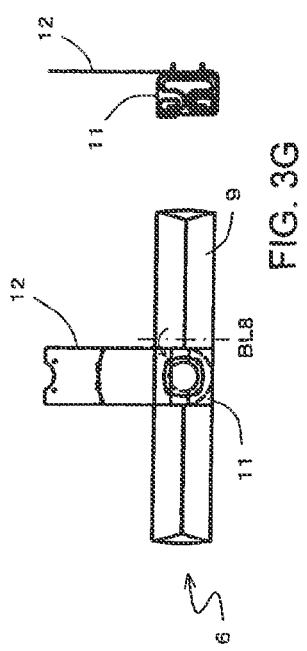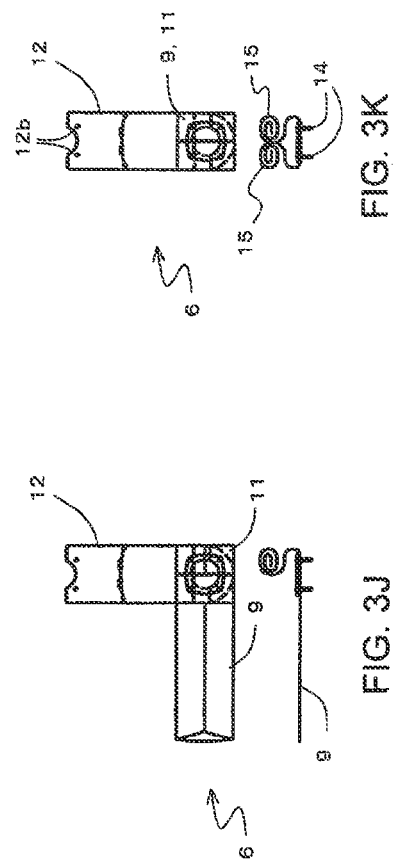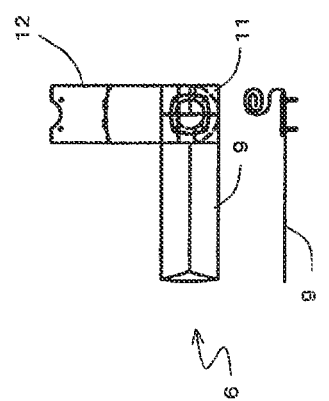

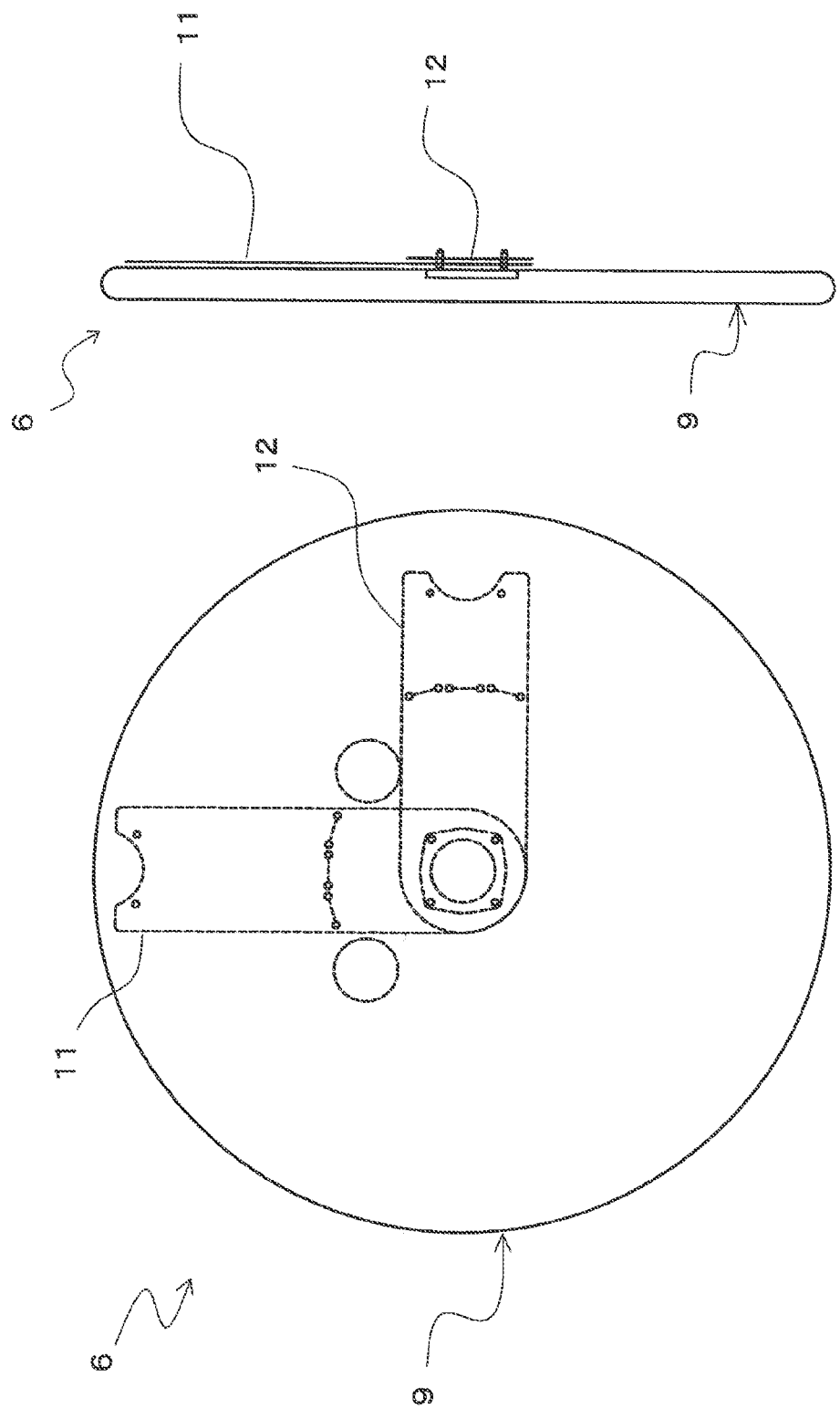

AIRBAG AND AIRBAG APPARATUS

CROSS-REFERENCE TO RELATED APPLICATION

This application claims priority under 35 U.S.C. §119 to Japanese Patent Application No, JP2010-082497 filed on Mar. 31, 2010, the entire content of which is hereby incorporated herein by reference in its entirety.

FIELD OF THE INVENTION

The present invention relates to an airbag mounted to a vehicle such as an automobile, and an airbag apparatus comprising the same.

BACKGROUND OF THE INVENTION

Airbag apparatuses designed to inflate and deploy an airbag inside a vehicle in the event of a collision, abrupt deceleration, or the like, in order to absorb the impact to be incurred by an occupant are generally mounted in vehicles, such as automobiles. This airbag apparatus generally comprises a gas generator that generates gas under predetermined conditions, an airbag that is connected to the gas generator for inflation and deployment, and a retainer that houses the airbag. The applied shape and structure of the airbag are variegated, depending on conditions such as the installation location and required function.

While the airbag is normally folded up small and housed in the retainer, changes in the direction of deployment and overall shape of the airbag when the airbag inflates and deploys in an emergency greatly differ, depending on the structure and folding method of the airbag itself. In prior art, there have been proposed airbag structures and folding configurations designed based on an object to execute deployment in stages in the direction of protrusion toward the occupant (refer to JP 10-6897 A, for example).

Nevertheless, in the above-described prior art, only deployment in the direction of protrusion toward the occupant was taken into consideration, and not changes in shape with respect to lateral deployment orthogonal to the direction of protrusion. On the other hand, in recent years, there has been a call for the capability to configure changes in deployment shape in various directions to accommodate the layouts of relatively small vehicle interiors.

SUMMARY OF THE INVENTION

It is therefore an object of the present invention to provide an airbag, airbag apparatus, and steering apparatus that permit configuration of a deployment shape changing process for various deployment directions.

In order to achieve the above-described object, according to the first invention, there is provided an airbag comprising: an airbag main body formed into a pouch; an inner restricting cloth that comprises a tearable tear line and wraps and restricts the airbag main body that is in a first folded state, folded to achieve bundling toward a predetermined direction, in the bundled direction; and an outer restricting cloth that comprises a tearable tear line and wraps and restricts the airbag main body that is in a second folded state, folded to achieve further bundling from the first folded state toward a direction orthogonal to the predetermined direction, in the bundled direction further on the outside than the inner restricting cloth.

With the arrangement, when gas is supplied to the interior of the airbag main body folded in the second folded state in advance, the part of the airbag main body that is wrapped by only the outer restricting cloth, that is, the part not wrapped by the inner restricting cloth, starts inflation and deployment first on a priority basis. During this initial period of inflation and deployment, inflation and deployment is fostered in the lateral direction of the airbag not covered by the strip-shaped outer restricting cloth, making it easy to transition to a substantially linear deployment shape similar to the first folded state. Then, when deployment transitions to this shape, only the tear line of the outer restricting cloth ruptures, causing only the part not wrapped by the inner restricting cloth to further inflate and deploy, thereby deploying the two fan-shaped portions that extend laterally. At this point during deployment, the overall airbag main body has the capability of deployment in a certain directionality with respect to the lateral direction.

Furthermore, once the gas is adequately filled in the two fan-shaped portions, the gas continues to flow, causing the tear line of the inner restricting cloth also to rupture and the airbag main body to fully inflate and deploy. In such a staged process of inflation and deployment, the overall airbag main body is capable of shape changes that have directionality with respect to the lateral direction, making it possible to configure changes in the deployment shape in a variety of directions other than the direction of protrusion toward the occupant, depending on the orientation in which the airbag is installed and the dimensions of each part. As a result, it is possible to configure a deployment shape changing process with respect to various deployment directions.

According to the second invention, in the airbag according to the first invention, the inner restricting cloth is disposed between a part wrapped by the inner restricting cloth and another part of the airbag main body in the second folded state; and the outer restricting cloth is disposed around an outer periphery of the airbag main body in the second folded state, overlapping the inner restricting cloth.

With the arrangement, the part that is wrapped by the inner restricting cloth is wrapped by both the inner restricting cloth and the outer restricting cloth, making deployment relatively difficult, and the part that is not wrapped by the inner restricting cloth is wrapped by only the outer restricting cloth, making deployment relatively easy. In each of parts of the same airbag main body, ease of deployment is clearly distinguished by the number of wrapped belts, making it possible to establish an order of priority for deployment initiation in the initial period of deployment.

According to the third invention, in the airbag according to the first invention, the inner restricting cloth wraps the airbag main body in the first folded state with a length that maintains space between the inner restricting cloth and the airbag main body in the first folded state.

With the arrangement, the tear line of the inner restricting cloth does not rupture even when the outer restricting cloth ruptures and only the part not wrapped by the inner restricting cloth is in the midst of significant inflation and deployment. Therefore, a bloused area where a space is remained permits slight inflation of the part that is wrapped by the inner restricting cloth. As a result, it is possible to maintain the passage required for gas flow in parts wrapped by the inner restricting cloth and move the overall airbag main body in the direction of protrusion toward the occupant, passing over the side wall of the retainer that houses the airbag and freely deploying the part not wrapped by the inner restricting cloth.

According to the fourth invention, in the airbag according to the first invention, the airbag main body in the first folded state is bundled in two primary bundles divided between both ends in a predetermined direction; and the tear lines of the inner restricting cloth and the outer restricting cloth are both formed at off-center positions of the airbag main body in the second folded state.

With this arrangement, the airbag main body is clearly divided and folded into the two primary bundles as a whole, with at least the tear line of the inner restricting cloth disposed so that it overlaps one of the two primary bundles. As a result, when the tear line of the inner restricting cloth ruptures, the primary bundle overlapped by the tear line can preferentially start inflation and deployment, making it possible, in other words, to establish a difference in the start timing of inflation and deployment between the two primary bundles. With this arrangement, even for components of the overall airbag main body having a deployment direction that protrudes toward the occupant, it is possible to configure a deployment shape changing process that differs according to the direction in which the primary bundles are aligned.

According to the fifth invention, in the airbag according to the fourth invention, the inner restricting cloth and the outer restricting cloth are both wrapped toward same direction, and the tear lines of the inner restricting cloth and the outer restricting cloth are both formed on the same side with respect to the center of the airbag main body in the second folded state.

With the arrangement, the primary bundle that is overlapped by both of the tear lines of the inner restricting cloth and the outer restricting cloth can be caused to preferentially inflate and deploy.

According to the sixth invention, in the airbag according to the fifth invention, in a predetermined standard posture, the inner restricting cloth and the outer restricting cloth are both wrapped in a vertical direction, and the tear lines of the inner restricting cloth and the outer restricting cloth are both disposed on the upper side with respect to the center of the airbag main body.

With the arrangement, in the predetermined standard posture, two primary bundles that fold the airbag main body are allayed along an up-down direction. Thus, the primary bundle thereof positioned on the upper side is caused to preferentially inflate and deploy. As a result, it is possible to make the airbag main body deploy fastest toward the head portion of the occupant.

According to the seventh invention, in the airbag according to the fifth invention, in a predetermined standard posture, the inner restricting cloth and the outer restricting cloth are both wrapped in a vertical direction, and the tear lines of the inner restricting cloth and the outer restricting cloth are both disposed on the lower side with respect to the center of the airbag main body.

With the arrangement, in the predetermined standard posture, two primary bundles that fold the airbag main body are allayed along an up-down direction. Thus, the primary bundle thereof positioned on the lower side is caused to preferentially inflate and deploy. As a result, it is possible to make the airbag main body deploy fastest toward the abdomen portion of the occupant.

According to the eighth invention, in the airbag according to the fourth invention, the inner restricting cloth and the outer restricting cloth are both wrapped in the same direction, and the tear lines of the inner restricting cloth and the outer restricting cloth are formed on opposite sides with respect to the center of the airbag main body in the second folded state.

With the arrangement, the priority of inflation and deployment of the two primary bundles can be changed when the tear lines of the respective inner restricting cloth and outer restricting cloth are caused to rupture in stages, making it possible to achieve deployment of any complex shape during the process of deployment of the airbag main body. Note that the effect caused by the rupture of the tear line of the inner restricting cloth has a higher degree of dominance with respect to the deployment shape of the airbag main body.

According to the ninth invention, in the airbag according to the eighth invention, in a predetermined standard posture, the inner restricting cloth and the outer restricting cloth are both wrapped in a vertical direction, the tear line of the inner restricting cloth is disposed on the upper side with respect to the center of the airbag main body, and the tear line of the outer restricting cloth is disposed on the lower side with respect to the center of the airbag main body.

With the arrangement, in the predetermined standard posture, two primary bundles that fold the airbag main body are allayed along an up-down direction. Thus, the primary bundle positioned on the lower side can be preferentially inflated and deployed immediately after the rupture of the tear line of the outer restricting cloth, and the primary bundle positioned on the upper side can be preferentially inflated and deployed after the rupture of the tear line of the inner restricting cloth. That is, the effect caused by the rupture of the tear line of the inner restricting cloth has a higher degree of dominance as described above, making it possible to achieve a form of deployment in which the upper part is somewhat more preferentially deployed than the lower part from the viewpoint of the airbag main body as a whole.

According to the tenth invention, in the airbag according to the eighth invention, in a predetermined standard posture, the inner restricting cloth and the outer restricting cloth are both wrapped in a vertical direction, the tear line of the inner restricting cloth is disposed on the lower side with respect to the center of the airbag main body, and the tear line of the outer restricting cloth is disposed on the upper side with respect to the center of the airbag main body.

With the arrangement, in the predetermined standard posture, two primary bundles that fold the airbag main body are allayed along an up-down direction. Thus, the primary bundle positioned on the upper side can be preferentially inflated and deployed immediately after the rupture of the tear line of the outer restricting cloth, and the primary bundle positioned on the lower side can be preferentially inflated and deployed after the rupture of the tear line of the inner restricting cloth. That is, the effect caused by the rupture of the tear line of the inner restricting cloth has a higher degree of dominance as described above, making it possible to achieve a form of deployment in which the lower part is somewhat more preferentially deployed than the upper part from the viewpoint of the airbag main body as a whole.

According to the eleventh invention, in the airbag according to the fourth invention, the airbag main body in the second folded state is bundled in two secondary bundles that is formed by dividing the airbag main body in the first folded state on both ends in the orthogonal direction; and the outer restricting cloth wraps the airbag main body in the second folded state in the direction bundled by the secondary bundles.

With this arrangement, the part of the airbag main body that is not wrapped by the inner restriction cloth is clearly divided and folded into the two secondary bundles. The tear line of the outer restricting cloth is disposed so that it overlaps one of the two secondary bundles. As a result, when the tear line of the outer restricting cloth ruptures, the secondary bundle overlapped by the tear line can preferentially start inflation and deployment, making it possible, in other words, to establish a difference in the start timing of inflation and deployment between the two secondary bundles. With this arrangement, even for components of the overall airbag main body having a deployment direction that protrudes toward the occupant, it is possible to configure a deployment shape changing process that differs according to the direction in which the secondary bundles are aligned.

According to the 12th invention, there is provided the airbag apparatus comprising: the airbag in the first invention; a retainer that houses the airbag; and a gas generator that injects gas to inflate the airbag main body.

With this arrangement, an airbag apparatus is performed that a retainer holds an folded state of the airbag in the normal condition and a gas generator flows a gas into airbag so as to inflate and deploy in an emergency.

According to the 13th invention, there is provided the steering apparatus comprising: a hub cover positioned at a rotational center of a steering wheel; and the airbag apparatus in the 12th invention that is provided on a back surface of the hub cover, wherein: the hub cover comprises: an emblem; and a cover tear line that tears the hub cover along the substantially radial direction while avoiding the emblem; and the tear lines of the inner restricting cloth and the outer restricting cloth are both disposed on the same side as the cover tear line with respect to the center of the emblem.

With this arrangement, it is possible to preferentially inflate and deploy the primary bundle positioned on the same side as the emblem. As a result, the cover half portion comprising the emblem and having a greater rotational radius can be quickly rotationally moved, making it possible to avoid contact with the body of the occupant.

ADVANTAGES

According to the invention, it is possible to configure a deployment shape changing process tier various deployment directions of the airbag main body.

BRIEF DESCRIPTION OF THE DRAWINGS

FIGS. 2A and 2B are a front view and side view of an airbag in a state prior to folding.

FIGS. 3A-3K are diagrams showing the assembly process of the airbag.

FIGS. 14A and 14B are a front view and side view of an airbag in a state prior to folding in a case where the inner and outer base cloths for wrapping are wrapped in mutually orthogonal directions.

DETAILED DESCRIPTION OF THE PREFERRED EMBODIMENTS

Embodiment 1 of the present invention is described below with reference to accompanying drawings. In the descriptions below, the vehicle front and rear directions and the vehicle left and right directions are the front and rear directions and left and right directions of the vehicle as seen by a seated occupant of the vehicle.

Figure 1:
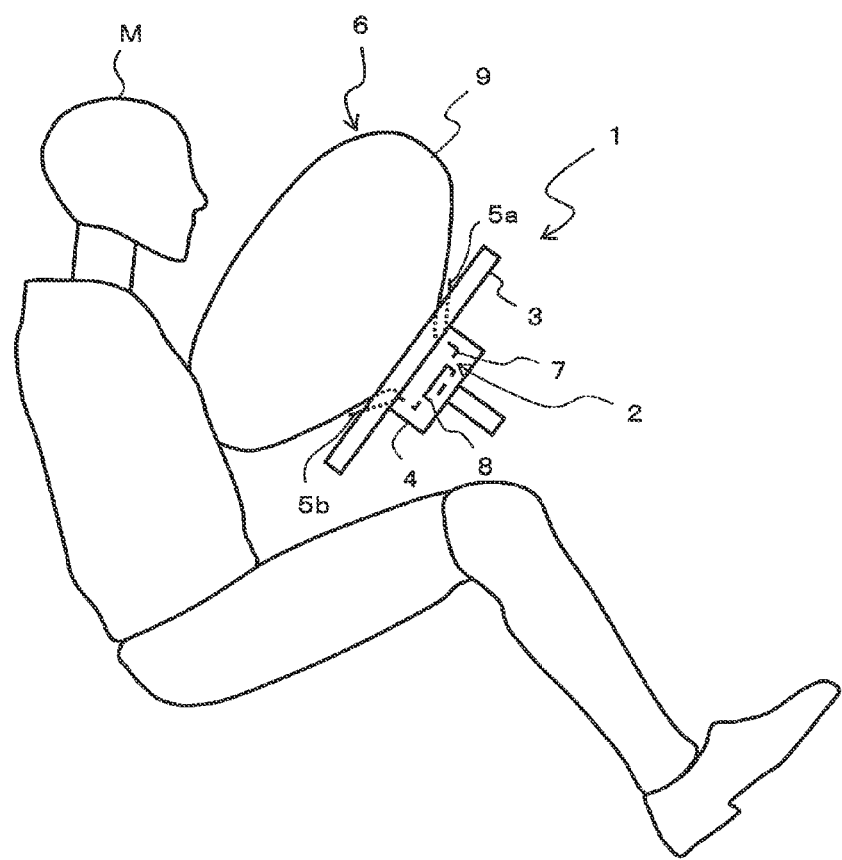
FIG. 1 is a side view illustrating the general structure in a case where an airbag apparatus according to an embodiment of the present invention is applied to a driver's seat airbag.

FIG. 1 is a side view illustrating the general structure in a case where an airbag apparatus according to the embodiment of the present invention is applied to a driver's seat airbag, and shows the airbag main body fully inflated and deployed.

In FIG. 1, a steering apparatus 1 is disposed in front of an occupant M seated in the driver's seat (at the vehicle front), with an airbag apparatus 2 provided inside this steering apparatus 1. This steering apparatus 1 comprises a steering wheel 3, a hub 4 positioned at the center thereof, and a plurality of spokes (refer to FIG. 7 and FIG. 8 described later) that connect the steering wheel 3 and the hub 4. A hub cover (refer to FIG. 7 described later) is provided on the front side of the hub 4 as viewed by the occupant, with half portions 5a and 5b of this hub cover formed by vertical division thereof at the substantial center moving rotationally upward and downward in the figure (to be described in detail later).

The airbag apparatus 2 is provided on the inside of the hub 4 on the back surface of the above-described hub cover, and comprises an airbag 6, a retainer 7 of a container shape that houses this airbag 6 in its entirety, and an inflator (gas generator) 8 provided at the bottom of this retainer 7. The airbag 6 comprises an airbag main body 9 that is inflated and deployed in the figure, and two base cloths for wrapping (not particularly shown in FIG. 1) to be described in detail later.

The airbag main body 9 is generally formed in a pouch shape as described in detail later, and is normally folded and wrapped by the two base cloths for wrapping described above and housed inside the retainer 7 (the folded state will be described in detail later). The inflator 8 is connected at an opening portion on the back surface of this airbag main body 9.

In the airbag apparatus 2 thus configured, the inflator 8 is activated by input of a control signal from a controller (not shown), thereby igniting an ignition agent therein, causing an outflow of gas. With this outflow, the internal pressure of the airbag main body 9 increases, causing the airbag main body 9 in a folded state to start inflation and deployment. In the inflation and deployment process of the airbag main body 9, the above-described two base cloths for wrapping rupture, causing the airbag main body 9 to inflate from the retainer 7 and the above-described hub cover 5 to vertically divide and the half portions 5a and 5b to move rotationally upward and downward. Subsequently, the airbag main body 9 continues to inflate, coming in contact with and restricting the upper body of the occupant M seated in the driver's seat as it absorbs impact.

FIG. 2A is a front view of the above-described airbag 6 in a state prior to folding, and FIG. 2B is a side view thereof. In FIG. 2, the airbag 6 comprises the airbag main body 9 and two base cloths 11 and 12 for wrapping as described above, and a retaining bracket 13. The airbag main body 9 in its entirety is formed into a pouch of a substantially circular shape, with a gas inlet port 9a formed at the center of the back surface thereof (front surface on the vehicle front side; back surface side in FIG. 2A and right side in FIG. 2B) and two vent holes 9b for discharging the inner gas and decreasing the pressure formed on both sides thereof. The retaining bracket 13 of a substantially ring shape having the same inner diameter as the above-described gas inlet port 9a is coaxially disposed with the gas inlet port 9a in the interior of the airbag main body 9, and four locking bolts 14 are provided at equal intervals in the peripheral direction on the back surface of this retaining bracket 13, each passing through the airbag main body 9.

In addition, the inner base cloth 11 for wrapping (inner restricting cloth) and the outer base cloth 12 for wrapping (outer restricting cloth) are provided in that order on the back surface of the airbag main body 9, from the back surface side. Both of the base cloths 11 and 12 for wrapping are formed in a strip shape having a width wider than the diameter of the above-described gas inlet port 9a, with the base cloth 11 for wrapping formed slightly longer than the base cloth 12 for wrapping. In the example of this embodiment, the two base cloths 11 and 12 for wrapping are both disposed vertically and layered, with each of the lower ends thereof disposed so as to align and overlap the gas inlet port 9a of the airbag main body 9, creating an opening having the same inner diameter as the gas inlet port 9a. In addition, three slits are disposed substantially in series and in close proximity to one another at intermediate positions along the longitudinal direction of each of the base cloths 11 and 12 for wrapping, forming rupturable and tearable tear lines 11a and 12a. The arrangement of each of these tear lines 11a and 12a will be described later.

The assembly process of the airbag 6 that uses the above-described airbag main body 9 will now be described in detail with reference to FIG. 3A to FIG. 3K. Note that, in FIG. 3C to FIG. 3K, side views and bottom views are suitably provided as necessary.

First, the airbag main body 9 in the state shown in FIG. 3A, which is a front view of the above-described FIG. 2A, is folded once to the back side along a horizontal folding line BL1 in the upper area of the figure, orthogonal to the two base cloths 11 and 12 for wrapping, and then further folded to the same back side on a parallel folding line BL2 at the same folding width. On the other hand, the left and right parts extending obliquely downward are each folded to the back side on two folding lines BL3 and BL4 so as to form an approximate 90° vertex angle at the position farthest downward in the figure. With this arrangement, the airbag main body 9 in its entirety is formed into a substantially pentagonal shape as shown in FIG. 3B.

Next, the airbag main body 9 of the shape shown in FIG. 3B is folded to the front side along a folding line BL5 that is parallel to the two folding lines BL1 and BL2, at a position in the figure that is slightly higher than the gas inlet port 9a, thereby forming the state shown in FIG. 3C. In the state shown in FIG. 3C, the part folded along the two folding lines BL1 and BL2 is designed so that the edge of the airbag main body 9 rolls upward in the figure on the front side. Then, this part is further rolled inward, causing the airbag main body 9 to form a substantially triangular overall shape, as shown in FIG. 3D. Here, the part bundled in the inward roll is a bundle bundling almost the entire upper half of the airbag main body 9, as shown in the side view provided with FIG. 3D.

Next, the airbag main body 9 of the shape shown in FIG. 3D is folded to the back side along a folding line BL6 parallel with the bundle at a position slightly higher than the vertex angle farthest downward in the figure, and then folded to the front side along a folding line BL7 parallel with the bundle at a position slightly lower than the gas inlet port 9a in the figure. With this arrangement, the airbag main body 9 in its entirety forms the shape shown in FIG. 3E, and the part folded along the folding line BL6 is configured so that the vertex angle of the airbag main body 9 is folded downward in the figure on the front side. Then, this part is further rolled downward, causing the airbag main body 9 to form an overall shape such as shown in FIG. 3F.

Here, the part bundled in the downward roll forms a bundle bundling almost the entire lower half of the airbag main body 9. That is, the airbag main body 9 at this point is bundled so that the two bundles disposed horizontally in the figure are adjacent to one another in the vertical direction. In other words, the airbag main body 9 in its entirety forms a first folded state that is folded so that the airbag main body 9 is bundled vertically in the figure. The airbag main body 9 in this first folded state is then wrapped by the base cloth 11 for wrapping in the bundling direction (vertically in the figure) as shown in the side view provided with FIG. 3F, and the locking bolts 14 on the back surface are inserted through two insertion through-holes 11b formed at the end thereof to secure the wrap in place.

Figure 4:
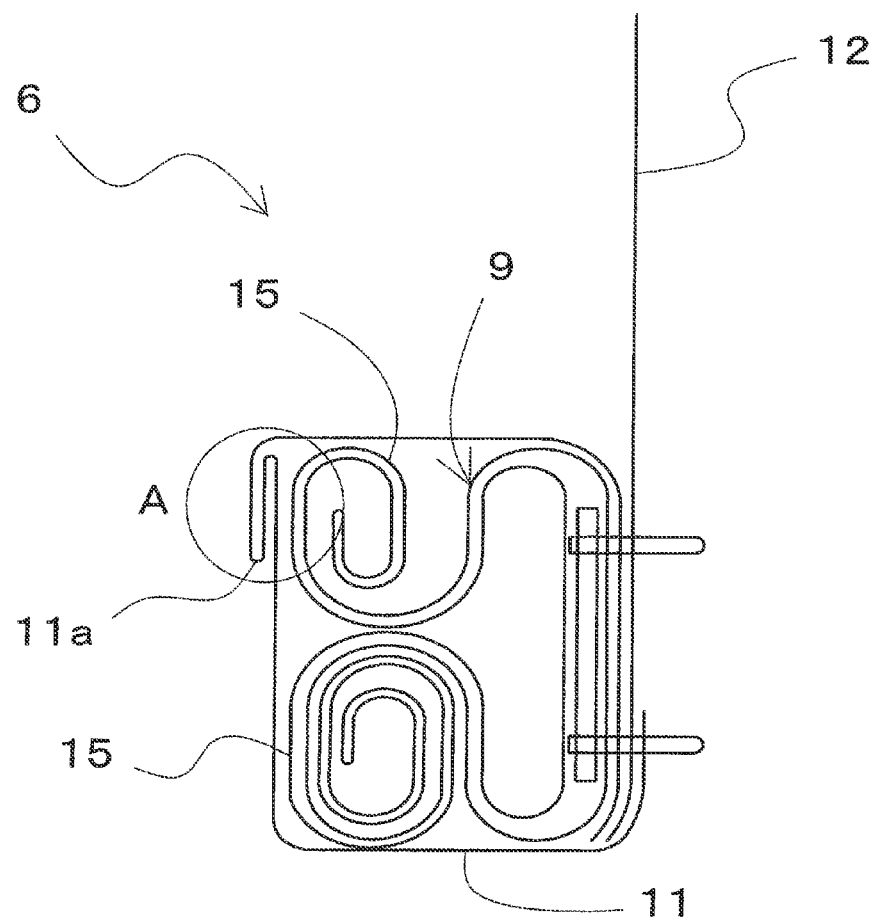
FIG. 4 is a diagram showing an enlarged view of the side view provided with FIG. 3G.

The state thus formed is the state shown in FIG. 3G, and an enlarged view of the side view provided thereto is shown in FIG. 4. In FIG. 4, the two bundles divided between both ends in the above-described bundling direction are hereinafter referred to as primary bundles 15. Then, the length of the entire base cloth 11 for wrapping is set to a dimension slightly longer than the length of the wrapped outer periphery of the airbag main body 9 in the first rolled state, and this extra length is folded twice and bloused (refer to Portion A in the figure) at an upper position on the front side (left side in FIG. 4), wrapping closely around the outer periphery of the airbag main body 9. The tearing line 11a of the base cloth 11 for wrapping in this example is formed so that it is disposed in this bloused part.

Returning to FIG. 3G, with the airbag main body 9 having the horizontally long shape shown in the figure, the right part not wrapped by the base cloth 11 for wrapping is folded along a vertically disposed folding line BL8 to the front side at a position slightly further toward the right in the figure than the base cloth 11 for wrapping so that it overlaps the left part not wrapped by the base cloth 11 for wrapping, fowling the state shown in FIG. 3H. In the state shown in FIG. 3H, the airbag main body 9 is folded to the front side along a vertically disposed folding line BL9 at a position slightly further toward the right in the figure than the end of the part thus folded along the folding line BL8, thereby forming the state shown in FIG. 3I.

The part thus folded along the folding line BL9 is configured so that the end of right part not wrapped by the base cloth 11 for wrapping is folded toward the right in the figure on the front side. This part is then further rolled inward to the right, causing the airbag main body 9 in its entirety to form a shape such as shown in FIG. 3J. Then, the left part not wrapped by the base cloth 11 for wrapping of the airbag main body 9 is also similarly folded and rolled inward in the opposite direction, causing the airbag main body 9 in its entirety to form a substantially rectangular shape as shown in FIG. 3K.

The airbag main body 9 at this point is bundled so that the right and left parts not wrapped by the base cloth 11 for wrapping are horizontally divided in the figure and placed adjacent to each other. In other words, the entire airbag main body 9 transitions from the above-described primary folded state to a secondary folded state that is folded so that the airbag main body 9 is further bundled in the horizontal direction in the figure. In FIG. 3K, the two bundles that divide the right and left parts not wrapped by the base cloth 11 for wrapping between both ends in the horizontal direction are hereinafter referred to as secondary bundles 16. With the airbag main body 9 in this second folded state, the base cloth 12 for wrapping is wrapped in the same wrapping direction (vertically in the figure) as the base cloth 11 for wrapping in this example, and the locking bolts 14 on the back surface are inserted through two insertion through-holes 12b formed at the end thereof to secure the wrap in place, thereby assembling the airbag 6 used in this embodiment as shown in FIG. 5.

FIG. 5A is a front view of the airbag 6, FIG. 5B is a side view, FIG. 5C is a bottom view, FIG. 5D is a back view, FIG. 5E is an internal structural view as viewed from the side into the interior, and FIG. 5F is a view of only the base cloth 12 for wrapping as viewed from the bottom. Note that, in FIG. 5A, the vertical and horizontal directions correspond with those in each of the figures in FIG. 3.

Figure 5:
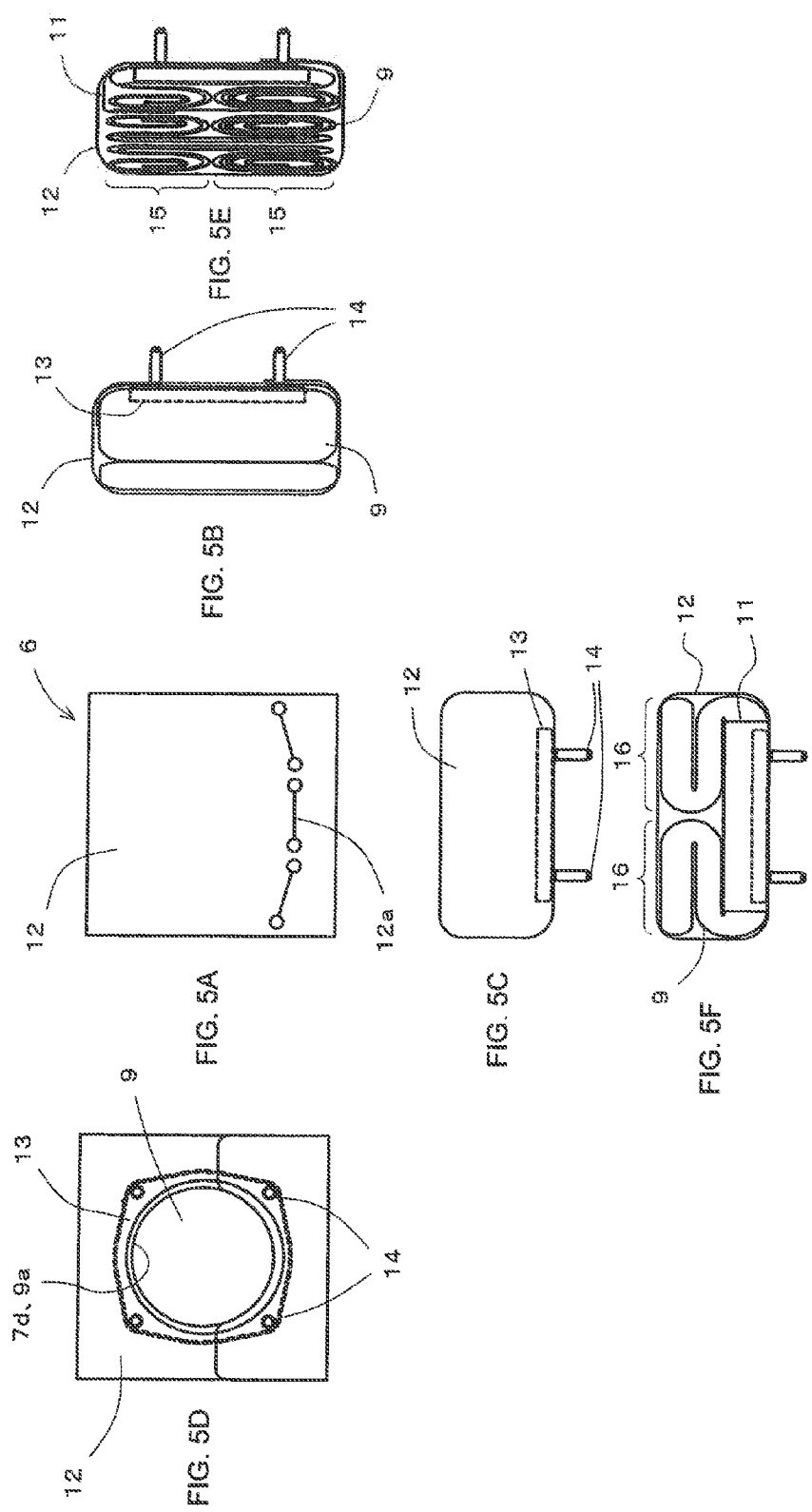
FIGS. 5A-5F are diagrams showing the airbag as viewed from all sides.

As shown in each of these figures in FIG. 5, the airbag 6 in a folded state forms a substantially rectangular solid shape overall. First, as shown in FIG. 5E, the base cloth 11 for wrapping is disposed between the part wrapped by the base cloth 11 for wrapping and the other part of the airbag main body 9 in the second folded state, and the base cloth 12 for wrapping is disposed around the outer periphery of the airbag main body 9 in the second folded state, overlapping the base cloth 11 for wrapping. In addition, the airbag main body 9 in this second folded state also has an overall internal structure comprising the two vertically divided primary bundles 15.

Then, in FIG. 5A, the tear line 12a of the base cloth 12 for wrapping in this example is formed so that it is disposed in a lower position on the front side of the airbag 6, with the tear lines 11a and 12a of the base cloth 12 for wrapping and the base cloth 11 for wrapping, respectively, formed on opposite sides with respect to the center of the airbag main body 9 in the second folded state (refer to FIG. 4 described above). That is, the tear line 11a of the base cloth 11 for wrapping is disposed so that it overlaps the primary bundle on the upper side, and the tear line 12a of the base cloth 12 for wrapping is disposed so that it overlaps the primary bundle on the lower side.

In FIG. 5F, the left and right parts not wrapped by the base cloth 11 for wrapping are respectively bundled in the two secondary bundles 16 divided horizontally. Note that, in the example shown in FIG. 5F, each of the secondary bundles 16 is bundled using only two folds and does not reach the aforementioned roll.

Figure 6:
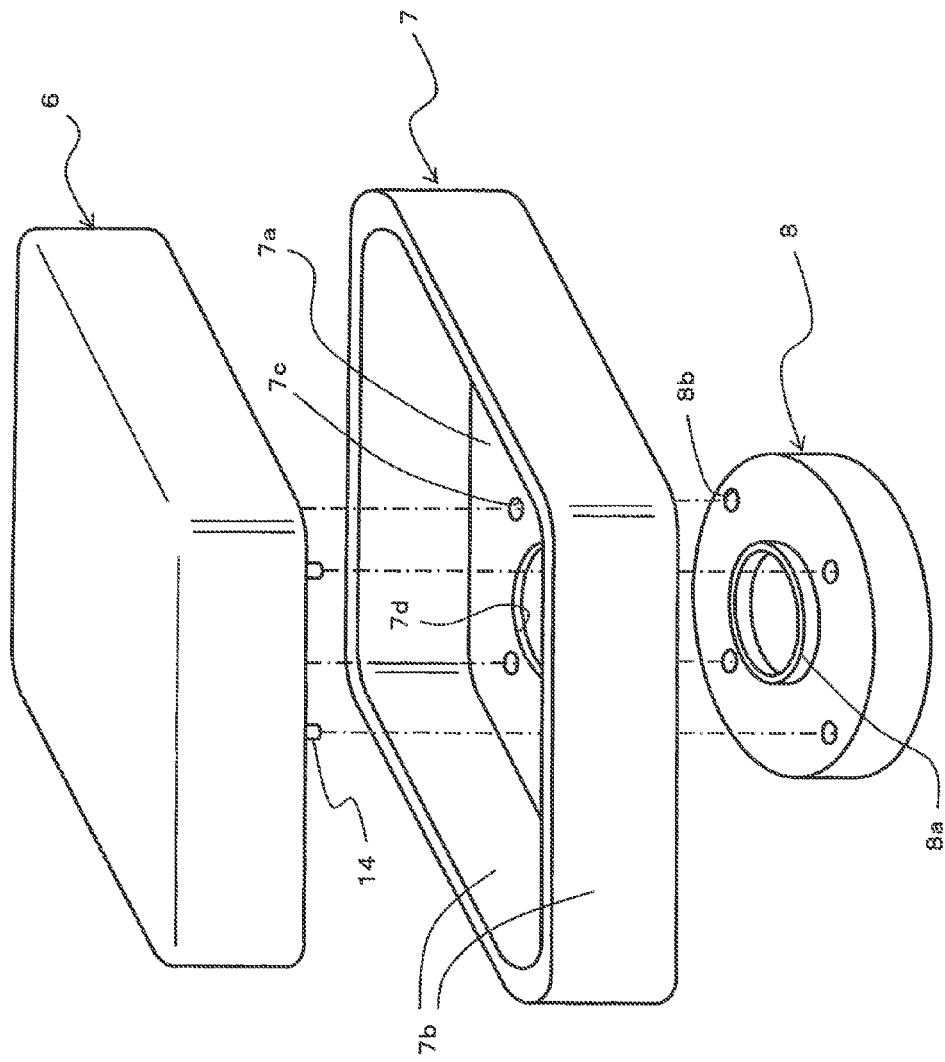
FIG. 6 is an exploded perspective view of an airbag apparatus.

FIG. 6 is an exploded perspective view of the air bag apparatus 2 of the present embodiment comprising the airbag 6 described above. As previously described, the airbag apparatus 2 comprises the airbag 6, the retainer 7, and the inflator 8.

The retainer 7 is a container-shaped member having a bottom 7a substantially rectangular and flat in shape and side walls 7b of the same height on each of the edge portions thereof, with the internal space therein capable of tightly housing the airbag 6. Bolt insertion through-holes 7c and a gas flow through-hole 7d respectively corresponding to each of the locking bolts 14 and the gas inlet port 9a are formed on the bottom 7a when the airbag 6 is housed inside the retainer 7.

The inflator 8 is generally formed in a substantially cylindrical shape in this example, and is provided with a gas port 8a on the surface that is in contact with the bottom 7a of the retainer 7. In addition, bolt insertion through-holes 8b corresponding to each of the locking bolts 14 are formed on this same contact surface.

The airbag 6, the retainer 7, and the inflator 8 are placed on top of one another with the center axes of the gas inlet port 9a, the gas flow through-port 7d, and the gas port 8a in alignment, thereby housing the airbag 6 inside the retainer 7 and placing the inflator 8 in contact with the back side of the bottom 7a of the retainer 7. Then, the locking bolts 14 of the airbag 6 are inserted through the bolt insertion through-holes 7c and 8b respectively corresponding to the bottom 7a of the retainer 7 and the inflator 8, and the ends thereof are tightened using nuts (not shown) to assemble the airbag apparatus 2. With such a configuration, in the airbag apparatus 2 of this embodiment, the retainer 7 retains the folded state of the airbag 6 during normal periods, and the inflator 8 injects gas into and inflates and deploys the airbag 6 when an emergency occurs.

Figure 7:
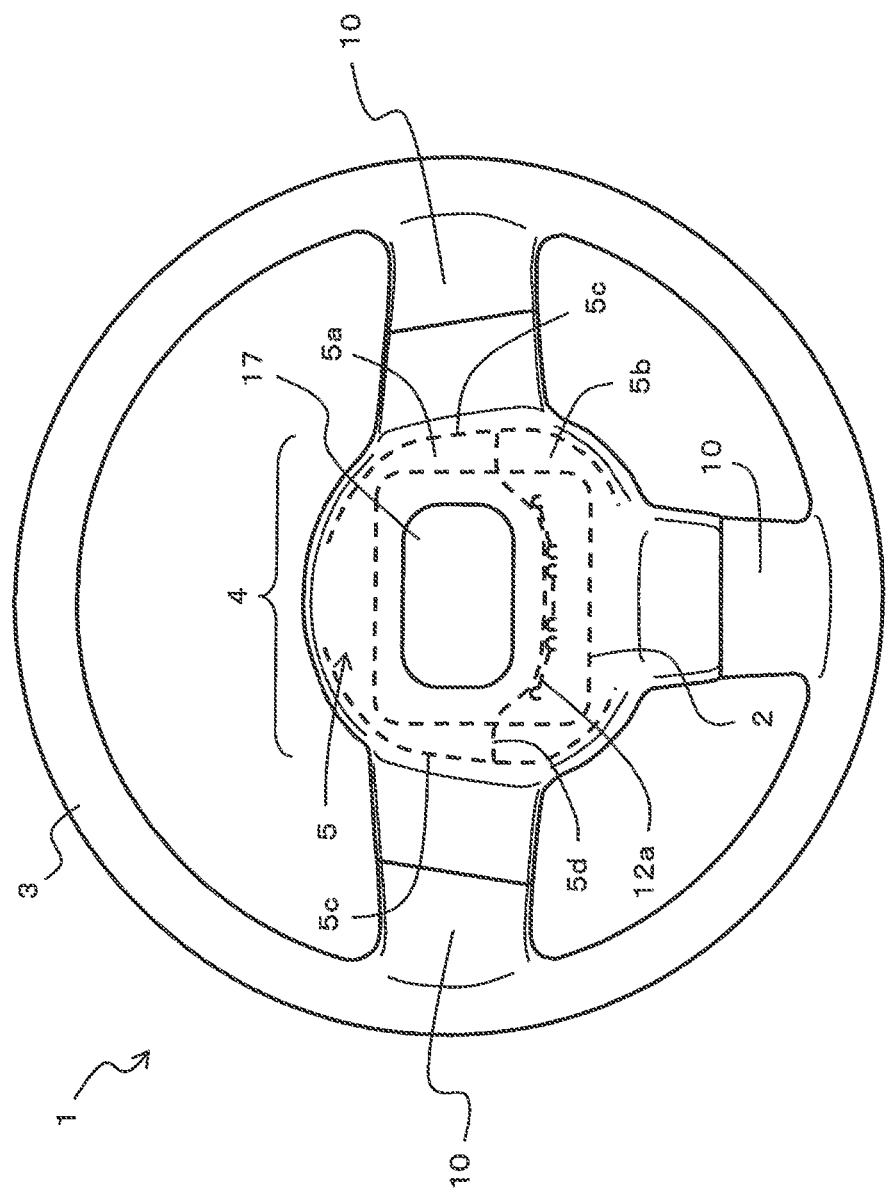
FIG. 7 is a front view of a steering apparatus comprising the airbag apparatus.

FIG. 7 is a front view of the steering apparatus 1 comprising the airbag apparatus 2 of this embodiment. In FIG. 7, in the steering apparatus 1, the hub 4 is disposed at the center position of the circular steering wheel 3, and three spokes 10 extended in the radial direction are connected in an integrated manner with the steering wheel 3 and the hub 4.

A hub cover 5 is provided on the front surface of the hub 4, and the airbag apparatus 2 is disposed on the inside of the hub 4, on the back side of this hub cover 5. In general, an emblem 17 decorated with a vehicle manufacturer name or trademark, etc., is often provided at the substantial center of such the hub cover 5 by a technique such as installation of a separately formed plate or embossing of the front surface of the hub cover 5. Then, in many cases, only the hub cover 5 and not this emblem 17 itself is ruptured and torn to inflate and deploy the airbag 6.

In this example as well, two lateral cover tear lines 5c are formed respectively along the horizontal edge portions of the hub cover 5, with a center cover tear line (cover tear line) 5d capable of tearing the hub cover 5 in the substantial radial direction while avoiding the emblem 17 formed across the two lateral cover tear lines 5c, from center portion to center portion. In addition, since the airbag 6 is disposed in the same direction as in the front view of FIG. 5A, the tear line 12a of the base cloth 12 for wrapping is disposed on the same side as the center cover tear line 5d with respect to the center of the emblem 17.

Figure 8:
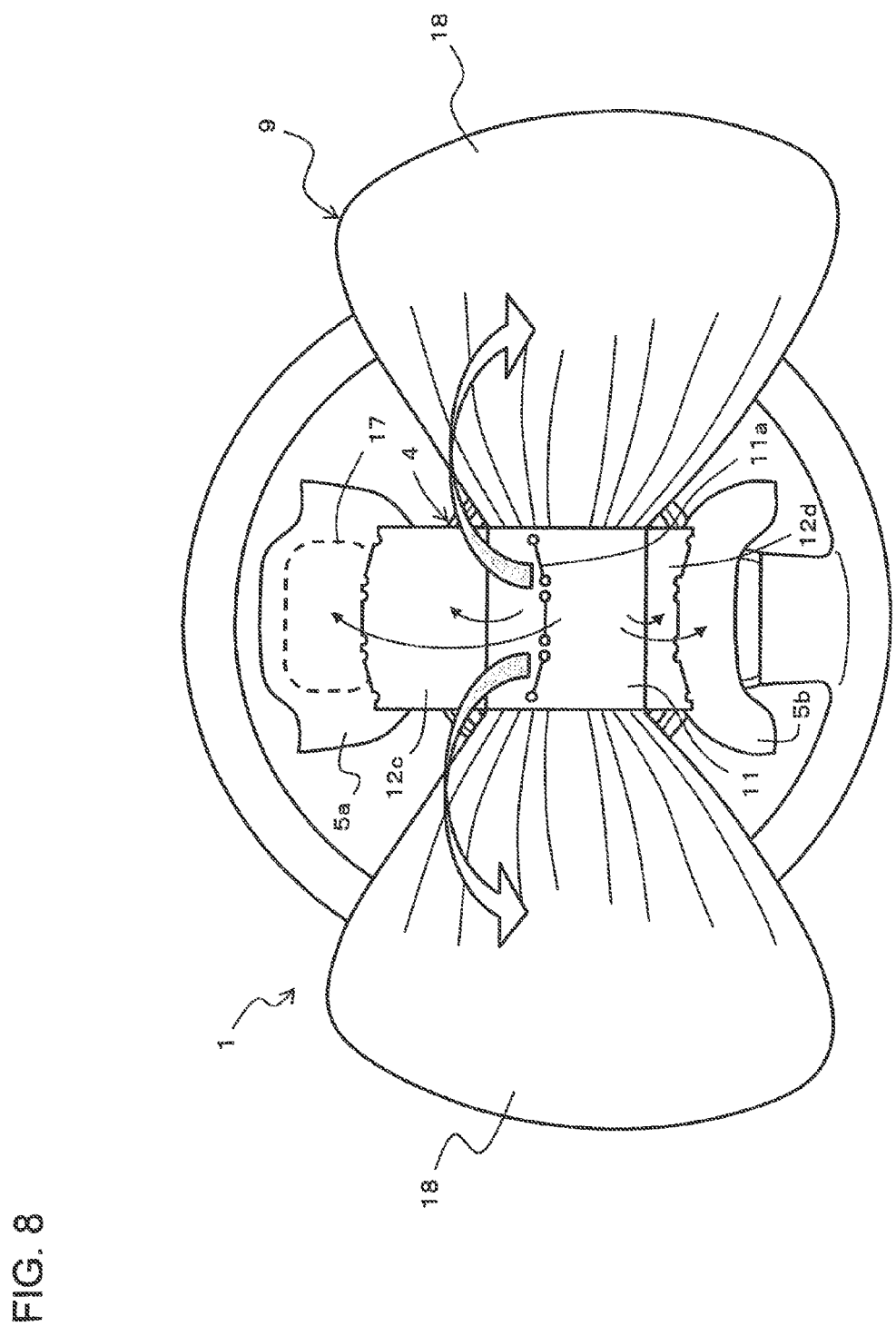
FIG. 8 is a diagram illustrating a state in which only the outer base cloth for wrapping is ruptured and torn after the airbag apparatus provided in the steering apparatus begins inflation and deployment.

FIG. 8 corresponds to FIG. 7 and shows a state in which the airbag apparatus 2 comprising the steering apparatus 1 is starting to inflate and deploy, causing only the base cloth 12 for wrapping to rupture and tear. In this FIG. 8, the base cloth 12 for wrapping and the hub cover 5 are each vertically divided along the tear lines 5c, 5d, and 12a, rotationally moving the each of the half portions 5a, 5b, 12c, and 12d upward and downward. Then, inflation and deployment proceeds for only the left and right portions (the parts of the two secondary bundles 16) of the airbag main body 9 that are not wrapped by the base cloth 11 for wrapping, deploying two fan-shaped portions 18 that extend laterally as shown in the figure.

Then, gas is further introduced, causing the tear line 11a of the base cloth 11 for wrapping to also rupture, thereby eventually completely inflating and deploying the airbag main body 9 as shown in FIG. 1. Note that, while the airbag apparatus 2 of this embodiment is configured so that gas is continually supplied from only one inflator 8 in this series of inflation and deployment processing, the present invention is not limited thereto. For example, although not particularly shown, a double inflator of a configuration in which two inflators are connected may be used, with each inflator activated in order based on the timing corresponding to the rupture and tear of each of the two base cloths 11 and 12 for wrapping.

According to the airbag apparatus 2 of this embodiment, as constituted as described above, the following advantages are obtained.

That is, when gas is supplied to the interior of the airbag main body 9 folded in the second folded state in advance, the part of the airbag main body 9 that is wrapped by only the base cloth 12 for wrapping, that is, the part not wrapped by the base cloth 11 for wrapping, starts inflation and deployment first on a priority basis. During this initial period of inflation and deployment, inflation and deployment is fostered in the lateral direction (in the horizontal direction in FIG. 5A, FIG. 7, and FIG. 8) of the airbag 6 not covered by the strip-shaped base cloth 12 for wrapping, making it easy to transition to a substantially linear deployment shape similar to the first folded state. Then, when deployment transitions to this shape, only the tear line 12a of the base cloth 12 for wrapping ruptures, causing only the part not wrapped by the base cloth 11 for wrapping to further inflate and deploy, thereby deploying the two fan-shaped portions 18 that extend laterally as shown in FIG. 8. At this point during deployment, the overall airbag main body 9 has the capability of deployment in a certain directionality with respect to the lateral direction.

Furthermore, once the gas is adequately filled in the two fan-shaped portions 18, the gas continues to flow, causing the tear line 11a of the base cloth 11 for wrapping also to rupture and the airbag main body 9 to fully inflate and deploy. In such a staged process of inflation and deployment, the overall airbag main body 9 is capable of shape changes that have directionality with respect to the lateral direction, making it possible to configure changes in the deployment shape in a variety of directions other than the direction of protrusion toward the occupant M, depending on the orientation in which the airbag 6 is installed and the dimensions of each part. As a result, it is possible to configure a deployment shape changing process with respect to various deployment directions.

In addition, in particular in this embodiment, the base cloth 11 for wrapping is disposed between the part wrapped by the base cloth 11 for wrapping and the other part (the part comprising the secondary bundles) of the airbag main body 9 in the second folded state, and the base cloth 12 for wrapping is disposed around the outer periphery of the airbag main body 9 in the second folded state, overlapping the base cloth 11 for wrapping. With this arrangement, within the airbag main body 9, the part that is wrapped by the base cloth 11 for wrapping is wrapped by both the base cloth 11 for wrapping and the base cloth 12 for wrapping, making deployment relatively difficult, and the part that is not wrapped by the base cloth 11 for wrapping is wrapped by only the base cloth 12 for wrapping, making deployment relatively easy. In each of these same parts of the airbag main body 9, ease of deployment is clearly distinguished by the number of wrapped belts, making it possible to establish an order of priority for deployment initiation in the initial period of deployment.

Further, in particular in this embodiment, the base cloth 11 for wrapping wraps the airbag main body 9 in the first folded state and is folded twice and bloused at a predetermined location (Portion A in FIG. 4). With this arrangement, the tear line 11a of the base cloth 11 for wrapping does not rupture even when the base cloth 12 for wrapping ruptures and only the part not wrapped by the base cloth 11 for wrapping is in the midst of significant inflation and deployment, permitting slight inflation in the part in which the bloused area of the part folded twice is wrapped by the base cloth 11 for wrapping. As a result, it is possible to maintain the passage required for gas flow in parts wrapped by the base cloth 11 for wrapping and move the overall airbag main body 9 in the direction of protrusion toward the occupant, passing over the side wall 7b of the retainer 7 that houses the airbag 6 and freely deploying the part not wrapped by the base cloth 11 for wrapping.

Further, in particular in this embodiment, the airbag main body 9 in the first folded state is bundled in the two primary bundles 15 that divide both ends in a predetermined direction (vertically in FIG. 3), and the tear lines 11a and 12a of each of the base cloths 11 and 12 for wrapping are both formed in off-center positions on the airbag main body 9 in the second folded state. With this arrangement, the airbag main body 9 is clearly divided and folded into the two primary bundles 15 as a whole, with at least the tear line 11a of the base cloth 11 for wrapping disposed so that it overlaps one of the two primary bundles 15 (the upper primary bundle 15 in this example). As a result, when the tear line 11a of the base cloth 11 for wrapping ruptures, the primary bundle 15 overlapped by the tear line 11a can preferentially start inflation and deployment, making it possible, in other words, to establish a difference in the start timing of inflation and deployment between the two primary bundles 15. With this arrangement, even for components of the overall airbag main body 9 having a deployment direction that protrudes toward the occupant, it is possible to configure a deployment shape changing process that differs according to the direction in which the primary bundles 15 are aligned.

Figure 9:
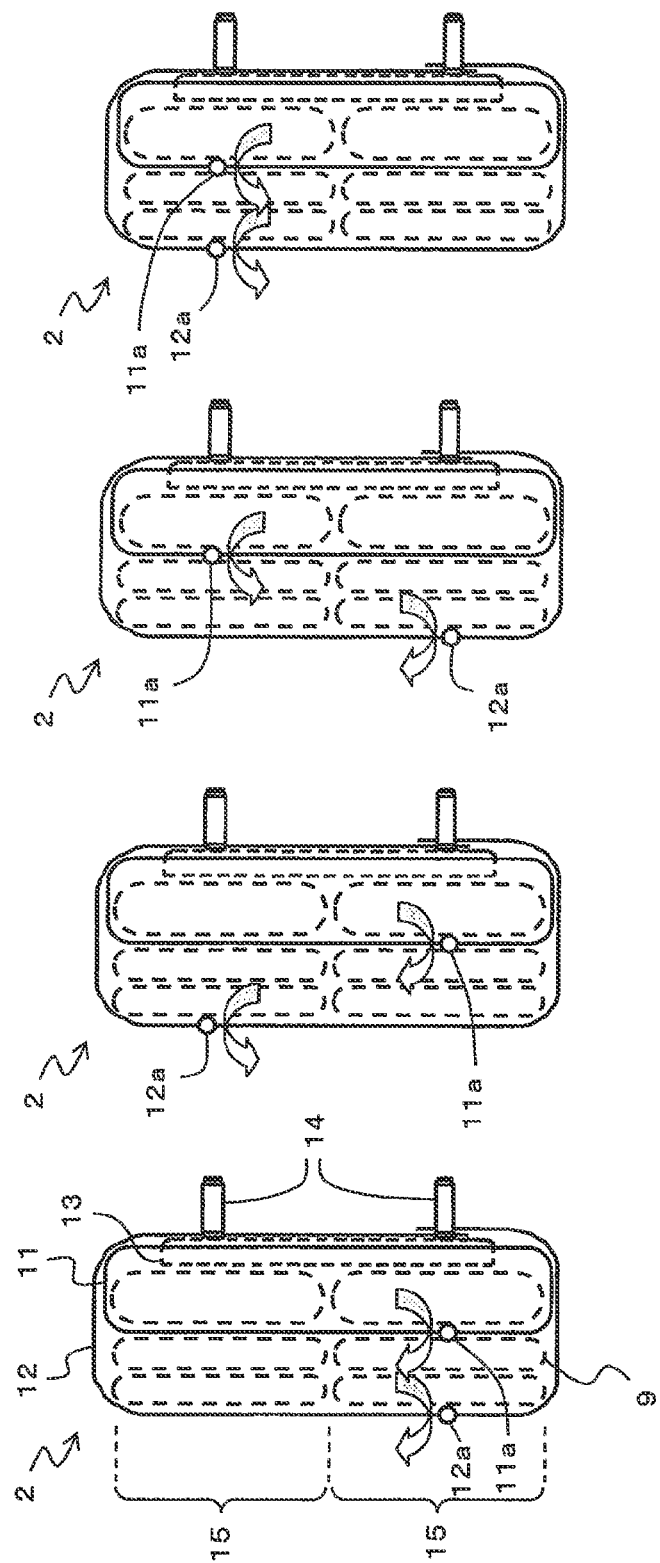
FIGS. 9A-9D are diagrams illustrating variations of the layout relationship of the tear lines of each base cloth for wrapping.

Possible variations of the positional relationship of the two tear lines 11a and 12a are illustrated in FIG. 9, FIG. 9 shows views of the inner lateral surface shown in FIG. 5E with variations of the positional relationship of the tear lines 11a and 12a of the base cloths 11 and 12 for wrapping, based on the premise that both of the base cloths 11 and 12 for wrapping are wrapped in the same vertical direction with the airbag 6 in a predetermined standard posture in the direction of rotation (that is, in a state where the steering wheel is in a neutral position), as in the example of the embodiment. FIG. 9A shows a case where both of the tear lines 11a and 12a of the base cloths 11 and 12 for wrapping are disposed on the lower side. FIG. 9B shows a case where the tear line 12a of the base cloth 12 for wrapping is disposed on the upper side, and the tear line 11a of the base cloth 11 for wrapping is disposed on the lower side. FIG. 9C shows a case where the tear line 12a of the base cloth 12 for wrapping is disposed on the lower side, and the tear line 11a of the base cloth 11 for wrapping is disposed on the upper side, which is equivalent to the ease of the embodiment. FIG. 9D shows a case where both of the tear lines 11a and 12a of the base cloths 11 and 12 for wrapping are disposed on the upper side.

Each variation will now be described. First, as shown in FIG. 9A and FIG. 9D, in a case where the tear lines 11a and 12a of the base cloths 11 and 12 for wrapping are both formed on the same side with respect to the center of the airbag main body 9 in the second folded state, the primary bundle 15 that is overlapped by both of the tear lines 11a and 12a can be caused to preferentially inflate and deploy.

Figure 12:
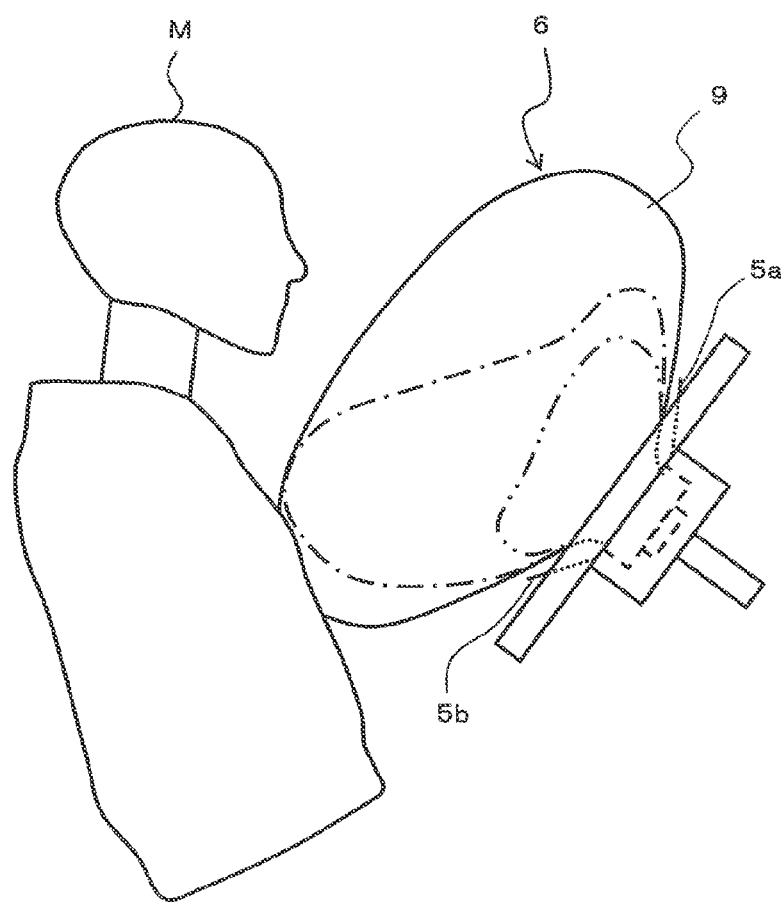
FIG. 12 is a diagram illustrating the process of inflation and deployment of an airbag apparatus with the tear line of the inner base cloth for wrapping disposed on the upper side, and the tear line of the outer restricting cloth disposed on the lower side.
Figure 13:
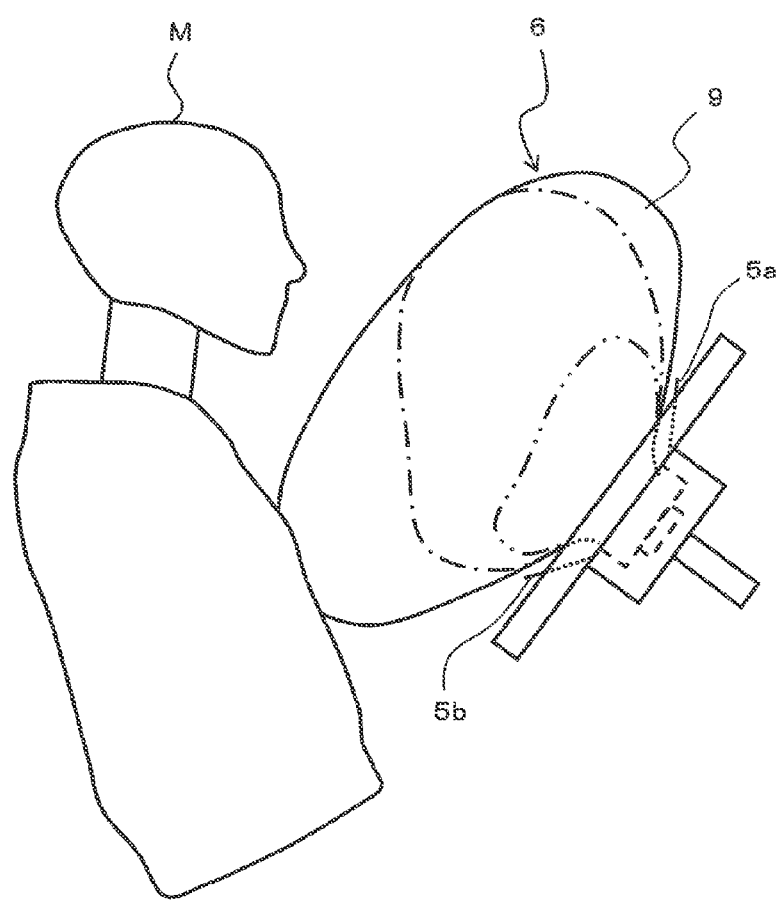
FIG. 13 is a diagram illustrating the process of inflation and deployment of the airbag apparatus with the tear lines of each base cloth for wrapping both on the upper side.

Of the two cases, in the case where the tear lines 11a and 12a of the base cloths 11 and 12 for wrapping are both disposed on the upper side with respect to the center of the airbag main body 9 as illustrated in FIG. 9D, the primary bundle 15 positioned on the upper side is caused to preferentially inflate and deploy. As a result, as shown in FIG. 13, it is possible to make the airbag main body 9 deploy fastest toward the head portion of the occupant. Note that, in FIG. 13, the chain double-dashed line indicates the deployment state of the airbag main body 9 after rupture of the base cloth 12 for wrapping only, and the chain single-dashed line indicates the deployment state of the airbag main body 9 in an intermediate stage immediately after rupture of the base cloth 11 for wrapping and before full deployment (the same holds true for the other corresponding figures, FIG. 10 to FIG. 12).

Figure 10:
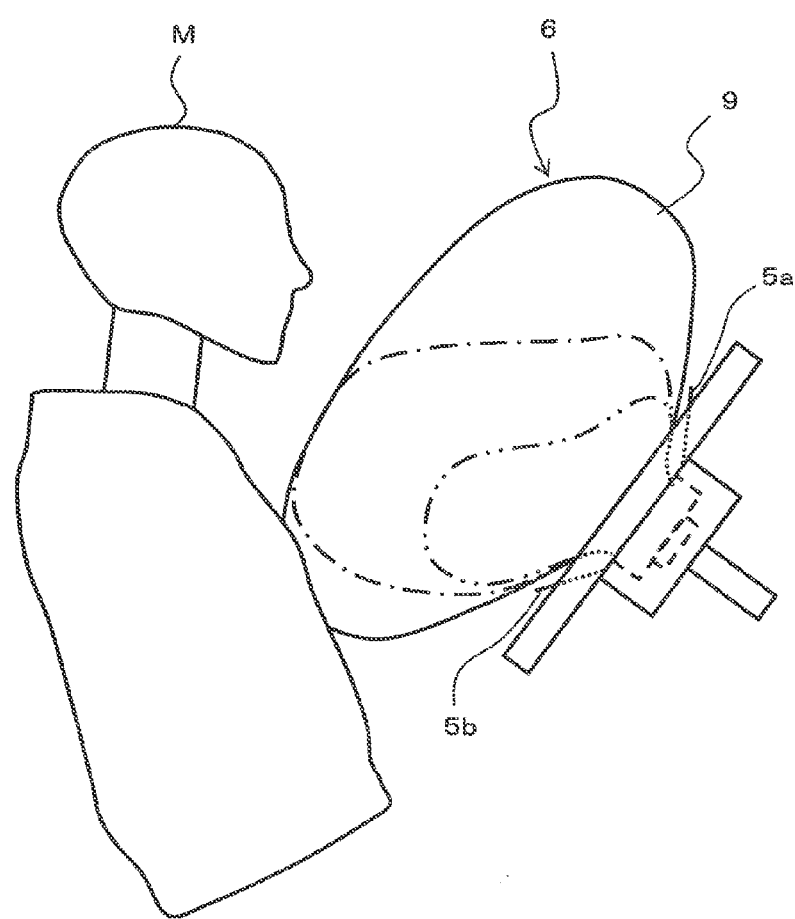
FIG. 10 is a diagram illustrating the process of inflation and deployment of the airbag apparatus with the tear lines of each base cloth for wrapping both on the lower side.

In addition, in a case where the tear lines 11a and 12a of the base cloths 11 and 12 for wrapping are both disposed on the lower side with respect to the center of the airbag main body 9 as illustrated in FIG. 9A, the primary bundle 15 positioned on the lower side is caused to preferentially inflate and deploy. As a result, as shown in FIG. 10, it is possible to make the airbag main body 9 deploy fastest toward the abdomen portion of the occupant M.

On the other hand, as shown in FIG. 9B and FIG. 9C, in a case where the tear lines 11a and 12a of the respective base cloths 11 and 12 for wrapping are formed on opposite sides with respect to the center of the airbag main body 9 in the second folded state, the priority of inflation and deployment of the two primary bundles 15 can be changed when the tear lines 11a and 12a of the respective base cloths 11 and 12 for wrapping are caused to rupture in stages, making it possible to achieve deployment of any complex shape during the process of deployment of the airbag main body 9. Note that the effect caused by the rupture of the tear line 11a of the base cloth 11 for wrapping has a higher degree of dominance with respect to the deployment shape of the airbag main body 9.

Of the two cases, in the case where the tear line 11a of the base cloth 11 for wrapping is disposed on the upper side with respect to the center of the airbag main body 9 and the tear line 12a of the base cloth 12 for wrapping is disposed on the lower side with respect to the center of the airbag main body 9 as shown in FIG. 9C, the primary bundle 15 positioned on the lower side can be preferentially inflated and deployed immediately after the rupture of the tear line 12a of the base cloth 12 for wrapping, and the primary bundle 15 positioned on the upper side can be preferentially inflated and deployed after the rupture of the tear line 11a of the base cloth 11 for wrapping. That is, the effect caused by the rupture of the tear line 11a of the base cloth 11 for wrapping has a higher degree of dominance as described above, making it possible to achieve a form of deployment in which the upper part is somewhat more preferentially deployed than the lower part from the viewpoint of the airbag main body 9 as a whole, as illustrated in FIG. 12.

Figure 11:
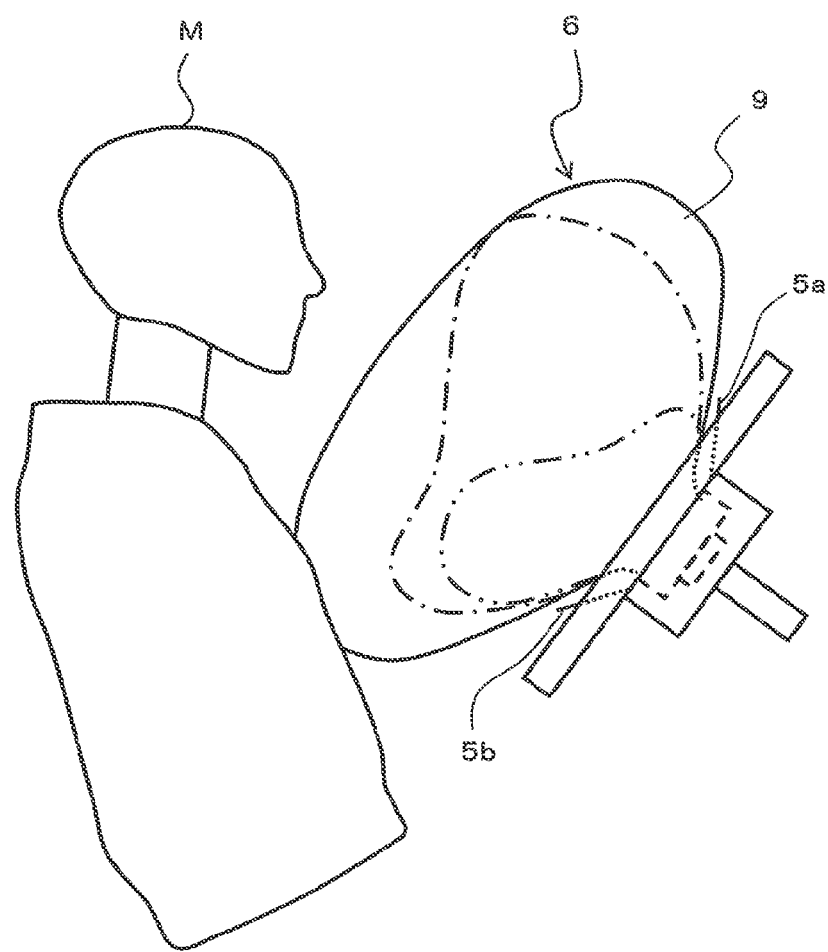
FIG. 11 is a diagram illustrating the process of inflation and deployment of an airbag apparatus with the tear line of the inner base cloth for wrapping disposed on the lower side, and the tear line of the outer restricting cloth disposed on the upper side.

In addition, in a case where the tear line 11a of the base cloth 11 for wrapping is disposed on the lower side with respect to the center of the airbag main body 9 and the tear line 12a of the base cloth 12 for wrapping is disposed on the upper side with respect to the center of the airbag main body 9 as shown in FIG. 9B, the primary bundle 15 positioned on the upper side can be preferentially inflated and deployed immediately after the rupture of the tear line 12a of the base cloth 12 for wrapping, and the primary bundle 15 positioned on the lower side can be preferentially inflated and deployed after the rupture of the tear line 11a of the base cloth 11 for wrapping. That is, the effect caused by the rupture of the tear line 11a of the base cloth 11 for wrapping has a higher degree of dominance as described above, making it possible to achieve a form of deployment in which the lower part is somewhat more preferentially deployed than the upper part from the viewpoint of the airbag main body 9 as a whole, as illustrated in FIG. 11.

In addition, while the airbag 6 of this embodiment is formed with the tear lines 11a and 12a of the base cloths 11 and 12 for wrapping disposed in mutually different ways, both may be disposed on the side opposite the center cover tear line 5d (the upper side in the case of FIG. 7) with respect to the center of the emblem 17 of the hub cover 5. With this arrangement, it is possible to preferentially inflate and deploy the primary bundle 15 positioned on the same side as the emblem 17. As a result, the hub cover half portion 5a comprising the emblem 17 and having a greater rotational radius can be quickly rotationally moved, making it possible to avoid contact with the body of the occupant M.

Note that the present invention is not limited to a configuration in which the two base cloths 11 and 12 for wrapping both wrap the airbag main body 9 in the same direction, allowing wrapping in mutually orthogonal directions, for example. Specifically, as shown in FIG. 14 corresponding to FIG. 2, the configuration may be designed so that the base cloth 11 for wrapping is vertically disposed in the figure and the base cloth 12 for wrapping is horizontally disposed in the figure prior to folding, allowing the base cloth 12 for wrapping to horizontally wrap (in the direction of bundling in the secondary bundles 16) the airbag main body 9 in the second folded state. Then, the tear line 12a of the base cloth 12 for wrapping is formed in an off-center position on the airbag main body 9 in the second folded state, disposing the tear line 12a so that it overlaps one of the two secondary bundles 16.

As a result, when the tear line 12a of the base cloth 12 for wrapping ruptures, the secondary bundle 16 overlapped by the tear line 12a can preferentially start inflation and deployment, making it possible to establish a difference in the start timing of inflation and deployment between the two secondary bundles 16. With this arrangement, although not particularly shown, even for components of the overall airbag main body 9 having a deployment direction that protrudes toward the occupant, it is possible to configure a deployment shape changing process which differs according to the direction in which the secondary bundles 16 are aligned.

It is a matter of course that each configuration of the embodiment described above does not limit the contents of the present invention, and may be practiced in various other forms not departing from the spirit and scope of the invention.

What is claimed is:

1. An airbag comprising:
an airbag main body formed into a pouch;
an inner restricting cloth that comprises a tearable tear line and wraps and restricts said airbag main body that is in a first folded state, folded to achieve bundling toward a predetermined direction, in the bundled direction; and
an outer restricting cloth that comprises a tearable tear line and wraps and restricts said airbag main body that is in a second folded state, folded to achieve further bundling from said first folded state toward a direction orthogonal to said predetermined direction, in the bundled direction further on the outside than said inner restricting cloth.

2. The airbag according to claim 1, wherein:
said inner restricting cloth is disposed between a part wrapped by said inner restricting cloth and another part of said airbag main body in said second folded state; and
said outer restricting cloth is disposed around an outer periphery of said airbag main body in said second folded state, overlapping said inner restricting cloth.

3. The airbag according to claim 1, wherein:
said inner restricting cloth wraps said airbag main body in said first folded state with a length that maintains space between the inner restricting cloth and said airbag main body in said first folded state.

4. The airbag according to claim 1, wherein:
said airbag main body in said first folded state is bundled in two primary bundles divided between both ends in a predetermined direction; and
said tear lines of said inner restricting cloth and said outer restricting cloth are both formed at off-center positions of said airbag main body in said second folded state.

5. The airbag according to claim 4, wherein:
said inner restricting cloth and said outer restricting cloth are both wrapped toward same direction, and said tear lines of said inner restricting cloth and said outer restricting cloth are both formed on the same side with respect to the center of said airbag main body in said second folded state.

6. The airbag according to claim 5, wherein:
in a predetermined standard posture, said inner restricting cloth and said outer restricting cloth are both wrapped in a vertical direction, and said tear lines of said inner restricting cloth and said outer restricting cloth are both disposed on the upper side with respect to the center of said airbag main body.

7. The airbag according to claim 5, wherein:
in a predetermined standard posture, said inner restricting cloth and said outer restricting cloth are both wrapped in a vertical direction, and said tear lines of said inner restricting cloth and said outer restricting cloth are both disposed on the lower side with respect to the center of said airbag main body.

8. The airbag according to claim 4, wherein:
said inner restricting cloth and said outer restricting cloth are both wrapped in the same direction, and said tear lines of said inner restricting cloth and said outer restricting cloth are formed on opposite sides with respect to the center of said airbag main body in said second folded state.

9. The airbag according to claim 8, wherein:
in a predetermined standard posture, said inner restricting cloth and said outer restricting cloth are both wrapped in a vertical direction, said tear line of said inner restricting cloth is disposed on the upper side with respect to the center of said airbag main body, and said tear line of said outer restricting cloth is disposed on the lower side with respect to the center of said airbag main body.

10. The airbag according to claim 8, wherein:
in a predetermined standard posture, said inner restricting cloth and said outer restricting cloth are both wrapped in a vertical direction, said tear line of said inner restricting cloth is disposed on the lower side with respect to the center of said airbag main body, and said tear line of said outer restricting cloth is disposed on the upper side with respect to the center of said airbag main body.

11. The airbag according to claim 4, wherein:
said airbag main body in said second folded state is bundled in two secondary bundles that is formed by dividing said airbag main body in said first folded state on both ends in said orthogonal direction; and
said outer restricting cloth wraps said airbag main body in said second folded state in the direction bundled by said secondary bundles.

12. An airbag apparatus comprising:
an airbag according to claim 1;
a retainer that houses said airbag; and
a gas generator that injects gas to inflate said airbag main body.

13. A steering apparatus comprising:
a hub cover positioned at a rotational center of a steering wheel; and
an airbag apparatus according to claim 12 that is provided on a back surface of said hub cover, wherein:
said hub cover comprises:
an emblem; and
a cover tear line that tears said hub cover along the substantially radial direction while avoiding said emblem; and
said tear lines of said inner restricting cloth and said outer restricting cloth are both disposed on the same side as said cover tear line with respect to the center of said emblem.

* * * * *